US008586954B2

(12) United States Patent
Asayama et al.

(10) Patent No.: US 8,586,954 B2

(45) **Date of Patent: *Nov. 19, 2013**

(54) EXTREME ULTRAVIOLET LIGHT SOURCE APPARATUS

(75) Inventors: Takeshi Asayama, Hiratsuka (JP); Kouji Kakizaki, Hiratsuka (JP); Akira Endo, Jena (DE); Shinji Nagai, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,177

(22) Filed: Mar. 13, 2012

(65) Prior Publication Data

US 2012/0176036 A1 Jul. 12, 2012

Related U.S. Application Data

(63) Continuation of application No. 12/705,287, filed on Feb. 12, 2010, now Pat. No. 8,158,959.

(30) Foreign Application Priority Data

Feb. 12, 2009 (JP) ................................ 2009-030238
Feb. 10, 2010 (JP) ................................ 2010-028192

(51) Int. Cl.

| | |
|---|---|
| ***G01N 21/00*** | (2006.01) |
| ***G01N 21/33*** | (2006.01) |
| ***H05G 2/00*** | (2006.01) |

(52) U.S. Cl.

USPC .................. 250/504 R; 250/423 R; 250/425; 250/461.1; 250/487.1; 250/365; 315/111.21

(58) Field of Classification Search

USPC ........... 250/504 R, 423 R, 425, 461.1, 487.1, 250/365; 315/111.21

See application file for complete search history.

(56) References Cited

U.S. PATENT DOCUMENTS

| | | | |
|---|---|---|---|
| 3,433,151 | A | 3/1969 | Farran et al. |
| 6,133,577 | A | 10/2000 | Gutowski et al. |
| 6,304,630 | B1 | 10/2001 | Bisschops et al. |
| 6,377,651 | B1 | 4/2002 | Richardson et al. |

(Continued)

FOREIGN PATENT DOCUMENTS

| | | |
|---|---|---|
| JP | 05-303999 | 11/1993 |
| JP | 06-241847 | 9/1994 |

(Continued)

OTHER PUBLICATIONS

Japanese Office Action, with English translation, issued in Application No. 2010-028192 dated Sep. 10, 2013.

*Primary Examiner* — Nikita Wells

(74) *Attorney, Agent, or Firm* — McDermott Will & Emery LLP

(57) ABSTRACT

An extreme ultraviolet light source apparatus generating an extreme ultraviolet light from plasma generated by irradiating a target material with a laser light within a chamber, and controlling a flow of ions generated together with the extreme ultraviolet light using a magnetic field or an electric field, the extreme ultraviolet light source apparatus comprises an ion collector device collecting the ion via an aperture arranged at a side of the chamber, and an interrupting mechanism interrupting movement of a sputtered particle in a direction toward the aperture, the sputtered particle generated at an ion collision surface collided with the ion in the ion collector device.

17 Claims, 14 Drawing Sheets

(56) References Cited

U.S. PATENT DOCUMENTS

| | | | | |
|---|---|---|---|---|
| 6,493,423 | B1 | 12/2002 | Bisschops | |
| 6,504,903 | B1 | 1/2003 | Kondo et al. | |
| 6,664,554 | B2 | 12/2003 | Klebanoff et al. | |
| 6,683,936 | B2 | 1/2004 | Jonkers | |
| 6,838,684 | B2 | 1/2005 | Bakker et al. | |
| 6,919,573 | B2 | 7/2005 | Roux | |
| 6,968,850 | B2 | 11/2005 | Chan et al. | |
| 6,987,279 | B2 | 1/2006 | Hoshino et al. | |
| 7,026,629 | B2 | 4/2006 | Bakker et al. | |
| 7,034,308 | B2 | 4/2006 | Bakker et al. | |
| 7,061,574 | B2 | 6/2006 | Bakker et al. | |
| 7,079,224 | B2 | 7/2006 | Tran et al. | |
| 7,095,479 | B2 | 8/2006 | Stevens et al. | |
| 7,106,832 | B2 | 9/2006 | Klunder et al. | |
| 7,109,503 | B1 | 9/2006 | Bowering et al. | |
| 7,116,394 | B2 | 10/2006 | Bakker et al. | |
| 7,135,692 | B2 | 11/2006 | Ivanov et al. | |
| 7,136,141 | B2 | 11/2006 | Bakker | |
| 7,141,806 | B1 | 11/2006 | Partlo et al. | |
| 7,167,232 | B2 | 1/2007 | Banine et al. | |
| 7,180,083 | B2 | 2/2007 | Partlo et al. | |
| 7,196,342 | B2 | 3/2007 | Ershov et al. | |
| 7,217,940 | B2 | 5/2007 | Partlo et al. | |
| 7,217,941 | B2 | 5/2007 | Rettig et al. | |
| 7,233,010 | B2 | 6/2007 | Van Herpen et al. | |
| 7,233,013 | B2 | 6/2007 | Hergenhan et al. | |
| 7,247,870 | B2 | 7/2007 | Ershov et al. | |
| 7,251,012 | B2 | 7/2007 | Banine et al. | |
| 7,262,423 | B2 | 8/2007 | Van Herpen et al. | |
| 7,271,401 | B2 | 9/2007 | Imai et al. | |
| 7,288,777 | B2 | 10/2007 | Partlo et al. | |
| 7,297,968 | B2 | 11/2007 | Endo et al. | |
| 7,328,885 | B2 | 2/2008 | Schuermann et al. | |
| 7,355,191 | B2 | 4/2008 | Bykanov et al. | |
| 7,355,672 | B2 | 4/2008 | Van Herpen et al. | |
| 7,365,349 | B2 | 4/2008 | Partlo et al. | |
| 7,365,350 | B2 | 4/2008 | Tran et al. | |
| 7,365,351 | B2 | 4/2008 | Bowering et al. | |
| 7,372,049 | B2 | 5/2008 | Van Herpen et al. | |
| 7,388,220 | B2 | 6/2008 | Fomenkov | |
| 7,414,700 | B2 | 8/2008 | Van Herpen et al. | |
| 7,423,275 | B2 | 9/2008 | Lee et al. | |
| 7,462,841 | B2 | 12/2008 | Franken et al. | |
| 7,462,850 | B2 | 12/2008 | Banine et al. | |
| 7,598,503 | B2 | 10/2009 | Van Harpen et al. | |
| 7,652,272 | B2 | 1/2010 | Ruzic et al. | |
| 7,655,925 | B2 | 2/2010 | Bykanov et al. | |
| 7,663,127 | B2 | 2/2010 | Wood, II et al. | |
| 7,671,349 | B2 | 3/2010 | Bykanov et al. | |
| 7,812,329 | B2 | 10/2010 | Bykanov et al. | |
| 7,999,241 | B2 | 8/2011 | Nagai et al. | |
| 8,003,963 | B2 | 8/2011 | Nagai et al. | |
| 8,067,756 | B2 * | 11/2011 | Ueno et al. ................ | 250/504 R |
| 8,158,959 | B2 * | 4/2012 | Asayama et al. ......... | 250/504 R |
| 2004/0105084 | A1 | 6/2004 | Kurt et al. | |
| 2006/0091109 | A1 | 5/2006 | Partlo et al. | |
| 2006/0138348 | A1 | 6/2006 | Bakker | |
| 2006/0139604 | A1 | 6/2006 | Wassink et al. | |
| 2006/0226377 | A1 | 10/2006 | Hergenhan et al. | |
| 2006/0272672 | A1 | 12/2006 | Apetz | |
| 2006/0278833 | A1 | 12/2006 | Wilhelmus Van Herpen et al. | |
| 2007/0062557 | A1 | 3/2007 | Rakhimova et al. | |
| 2007/0115443 | A1 | 5/2007 | Box et al. | |
| 2007/0115445 | A1 | 5/2007 | Box et al. | |
| 2007/0187627 | A1 | 8/2007 | Ershov et al. | |
| 2007/0228298 | A1 | 10/2007 | Komori et al. | |
| 2008/0001101 | A1 | 1/2008 | Wilhelmus Van Herpen et al. | |
| 2008/0011967 | A1 | 1/2008 | Van Herpen et al. | |
| 2008/0067454 | A1 | 3/2008 | Wassink | |
| 2008/0073598 | A1 | 3/2008 | Moriya et al. | |
| 2008/0074655 | A1 | 3/2008 | Wilhelmus Van Herpen et al. | |
| 2008/0083878 | A1 | 4/2008 | Ehm et al. | |
| 2008/0083887 | A1 | 4/2008 | Komori et al. | |
| 2008/0087840 | A1 | 4/2008 | Ueno et al. | |
| 2008/0212044 | A1 | 9/2008 | Derra et al. | |
| 2008/0212045 | A1 | 9/2008 | Bader | |
| 2008/0225245 | A1 | 9/2008 | Wood et al. | |
| 2008/0267816 | A1 | 10/2008 | Ueno et al. | |
| 2008/0283779 | A1 | 11/2008 | Tran et al. | |
| 2009/0014666 | A1 | 1/2009 | Zink et al. | |
| 2009/0021705 | A1 | 1/2009 | Wilhelmus Van Herpen et al. | |
| 2009/0027637 | A1 | 1/2009 | Soer et al. | |
| 2009/0027919 | A1 | 1/2009 | Feng et al. | |
| 2009/0090877 | A1 | 4/2009 | Van Empel et al. | |
| 2009/0186282 | A1 | 7/2009 | Wu et al. | |
| 2009/0231707 | A1 | 9/2009 | Ehm et al. | |
| 2009/0250641 | A1 | 10/2009 | Moriya et al. | |
| 2009/0261242 | A1 | 10/2009 | Ueno et al. | |
| 2009/0272916 | A1 | 11/2009 | Soer et al. | |
| 2009/0295800 | A1 | 12/2009 | Vetter et al. | |
| 2010/0025231 | A1 | 2/2010 | Moriya et al. | |
| 2010/0032590 | A1 | 2/2010 | Bykanov et al. | |
| 2010/0034349 | A1 | 2/2010 | Kraus et al. | |
| 2010/0039632 | A1 | 2/2010 | Van Herpen et al. | |
| 2010/0051827 | A1 | 3/2010 | Derra et al. | |
| 2012/0097869 | A1 * | 4/2012 | Ueno et al. ................ | 250/504 R |

FOREIGN PATENT DOCUMENTS

| | | | |
|---|---|---|---|
| JP | 10-121231 | | 5/1998 |
| JP | 11-087090 | | 3/1999 |
| JP | 2000-088999 | | 3/2000 |
| JP | 2000-091096 | | 3/2000 |
| JP | 2000-298200 | | 10/2000 |
| JP | 2000-349009 | | 12/2000 |
| JP | 3141529 | | 12/2000 |
| JP | 2002-313598 | | 10/2002 |
| JP | 2003-022950 | | 1/2003 |
| JP | 2005-101537 | | 4/2005 |
| JP | 2005-197456 | | 7/2005 |
| JP | 2005-235883 | | 9/2005 |
| JP | 2005-235959 | | 9/2005 |
| JP | 2006-191057 | | 7/2006 |
| JP | 2006-529057 | | 12/2006 |
| JP | 2007-129066 | | 5/2007 |
| JP | 2007-207574 | | 8/2007 |
| JP | 2007-220949 | | 8/2007 |
| JP | 2007-258069 | | 10/2007 |
| JP | 2007-273239 | A | 10/2007 |
| JP | 2008-042078 | | 2/2008 |
| JP | 2008-103206 | A | 5/2008 |
| JP | 2008-118157 | | 5/2008 |
| JP | 2008-118158 | | 5/2008 |
| JP | 2008-177558 | | 7/2008 |
| JP | 2008-277481 | | 11/2008 |
| JP | 2008-277829 | | 11/2008 |
| JP | 2009-016640 | | 1/2009 |
| JP | 2009-021566 | | 1/2009 |
| JP | 2009-105307 | | 5/2009 |
| JP | 2009-105403 | | 5/2009 |
| JP | 4302733 | | 5/2009 |
| JP | 2009-130366 | | 6/2009 |
| JP | 2009-130367 | | 6/2009 |
| JP | 4329177 | | 6/2009 |
| JP | 2009-246046 | | 10/2009 |
| JP | 2009-267407 | | 11/2009 |
| JP | 2009-267408 | | 11/2009 |
| JP | 2010-010380 | | 1/2010 |
| JP | 2010-045355 | | 2/2010 |
| JP | 2010-045358 | | 2/2010 |
| JP | 2010-062560 | | 3/2010 |
| WO | WO 03/075098 | A3 | 9/2003 |
| WO | WO 2004/104707 | A3 | 12/2004 |
| WO | WO 2004/109405 | A3 | 12/2004 |
| WO | WO 2006/011105 | A3 | 2/2006 |
| WO | WO 2007/111504 | A1 | 10/2007 |
| WO | WO 2007/114695 | A1 | 10/2007 |
| WO | WO 2008/023460 | A1 | 2/2008 |
| WO | WO 2008/034582 | A3 | 3/2008 |

* cited by examiner

EXTREME ULTRAVIOLET LIGHT SOURCE APPARATUS

CROSS-REFERENCE TO RELATED APPLICATIONS

This application is a continuation of U.S. application Ser. No. 12/705,287, filed on Feb. 12, 2010, now U.S. Pat. No. 8,158,959, and claims the benefit of priority from the prior Japanese Patent Applications No. 2009-30238, filed on Feb. 12, 2009, and No. 2010-28192, filed on Feb. 10, 2010; the entire contents of which are incorporated herein by reference.

BACKGROUND OF THE INVENTION

1. Field of the Invention

The present invention relates to an extreme ultraviolet light source apparatus generating an extreme ultraviolet (EUV) light from a plasma generated by irradiating a target material with a laser light.

2. Description of the Related Art

In recent years, along with a progress in miniaturization of semiconductor device, miniaturization of transcription pattern used in photolithography in a semiconductor process has developed rapidly. In the next generation, microfabrication to the extent of 65 nm to 32 nm, or even to the extent of 30 nm and beyond will be required. Therefore, in order to comply with the demand of microfabrication to the extent of 30 nm and beyond, development of such exposure apparatus combining an extreme ultraviolet (EUV) light source for a wavelength of about 13 nm and a reduced projection reflective optics is expected.

As the EUV light source, there are three possible types, which are a laser produced plasma (LPP) light source using plasma generated by irradiating a target with a laser beam, a discharge produced plasma (DPP) light source using plasma generated by electrical discharge, and a synchrotron radiation (SR) light source using orbital radiant light. Among these light sources, the LPP light source has such advantages that luminance can be made extremely high as close to the black-body radiation because plasma density can be made higher compared with the DPP light source and the SR light source. Among these light sources, the LPP light source has such advantages that luminance can be made extremely high as close to the black-body radiation because plasma density can be made higher compared with the DPP light source and the SR light source. Furthermore, the LPP light source has such advantages that there is no construction such as electrode around a light source because the light source is a point light source with nearly isotropic angular distributions, and therefore extremely wide collecting solid angle can be acquired, and so on. Accordingly, the LPP light source having such advantages is expected as a light source for EUV lithography which requires more than several dozen to several hundred watt power.

In the EUV light source apparatus with the LPP system, firstly, a target material supplied inside a vacuum chamber is excited by irradiation with a laser light and thus be turned into plasma. Then, a light with various wavelength components including an EUV light is emitted from the generated plasma. Then, the EUV light source apparatus focuses the EUV light on a predetermined point by reflecting the EUV light using an EUV collector mirror which selectively reflects an EUV light with a desired wavelength, e.g. a 13.5 nm wavelength component. The reflected EUV light is inputted to an exposure apparatus. On a reflective surface of the EUV collector mirror, a multilayer coating (Mo/Si multilayer coating) with a structure in that thin coating of molybdenum (Mo) and thin coating of silicon (Si) are alternately stacked, for instance, is formed. The multilayer coating exhibits a high reflectance ratio (of about 60% to 70%) with respect to the EUV light with a 13.5 nm wavelength.

Here, as mentioned above, a plasma is generated by irradiating a target material with a laser light, and at the time of plasma generation, particles (debris) such as gaseous ion particles, neutral particles, and fine particles (such as metal cluster) which have failed to become plasma spring out from the plasma generation site to the surroundings. The debris are diffused and fly onto the surfaces of various optical elements such as an EUV collector mirror arranged in the vacuum chamber, focusing mirrors for focusing a laser light on a target, and other optical system for measuring an EUV light intensity, and so forth. When hitting the surfaces, fast ion debris with comparatively high energy erode the surface of optical elements and damage the reflective coating of the surfaces. As a result, the surfaces of the optical elements become a metal component, which is a target material. On the other hand, slow ion debris with comparatively low energy and neutral particle debris are deposited on the surfaces of optical elements. As a result, a compound layer made from the metallic target material and the material of the surface of the optical element is formed on the surface of the optical element. Damages to the reflective coating or formation of a compound layer on the surface of the optical element caused by such bombardment of debris decreases the reflectance ratio of the optical element and makes it unusable.

Japanese Patent Application Laid-open No. 2005-197456 discloses a technique for controlling ion debris flying from plasma using a magnetic field generated by a magnetic-field generator such as a superconductive magnetic body. According to the disclosed technique, a luminescence site of an EUV light is arranged within the magnetic field. Positively-charged ion debris flying from the plasma generated at the luminescence site are drifted and converge in the direction of magnetic field as if to wind around the magnetic line by Lorentz force of the magnetic field. This behavior prevents the deposition of debris on the surrounding optical elements, and thereby, the damages to the optical elements can be prevented. Additionally, the ion debris drifts while converging in the direction of the magnetic field. Therefore, it is possible to collect the ion debris efficiently by arranging an ion collection apparatus which collects ion debris in a direction parallel to the direction of magnetic field.

However, in the prior art, fast ion debris are supposed to collide with a collision surface of an ion collector device. This collision of fast ion debris sputters the collision surface whereby material of the collision surface flies out. Accordingly, there is a case where the sputtered material of the collision surface flies back again to the inside of the vacuum chamber and adheres to the optical elements such as the EUV collector mirror, and so forth, and an internal surface of the vacuum chamber.

On the other hand, if the target material adheres to the collision surface of the ion collector device, the adhered target material will be sputtered by the fast ion and fly out. As a result, there is a case where the sputtered target material flies back again to the inside of the vacuum chamber and adheres to the optical element such as the EUV collector mirror, and so forth, and the internal surface of the vacuum chamber.

BRIEF SUMMARY OF THE INVENTION

In accordance with one aspect of the present invention, an extreme ultraviolet light source apparatus generating an extreme ultraviolet light from plasma generated by irradiating a target material with a laser light within a chamber, and controlling a flow of ions generated together with the extreme ultraviolet light using a magnetic field or an electric field, the extreme ultraviolet light source apparatus comprises: an ion collector device collecting the ion via an aperture arranged at a side of the chamber; and an interrupting mechanism interrupting movement of a sputtered particle in a direction toward the aperture, the sputtered particle generated at an ion collision surface collided with the ion in the ion collector device.

In accordance with another aspect of the present invention, an extreme ultraviolet light source apparatus generating an extreme ultraviolet light from plasma generated by irradiating a target material with a laser light within a chamber, and controlling a flow of ion generated together with the extreme ultraviolet light using a magnetic field or an electric field, the extreme ultraviolet light source apparatus comprises: an ion collector device collecting the ion via an aperture arranged at a side of the chamber; and an interrupting mechanism arranged inside the ion collector device and having an ion collision surface which tilts with respect to a direction of movement of the ion.

These and other objects, features, aspects, and advantages of the present invention will become apparent to those skilled in the art from the following detailed description, which, taken in conjunction with the annexed drawings, discloses preferred embodiments of the present invention.

DETAILED DESCRIPTION OF THE INVENTION

Here, best mode embodiments of an extreme ultraviolet light source apparatus according to the present invention will be described in detail with reference to the accompanying drawings.

First Embodiment

Figure 1:
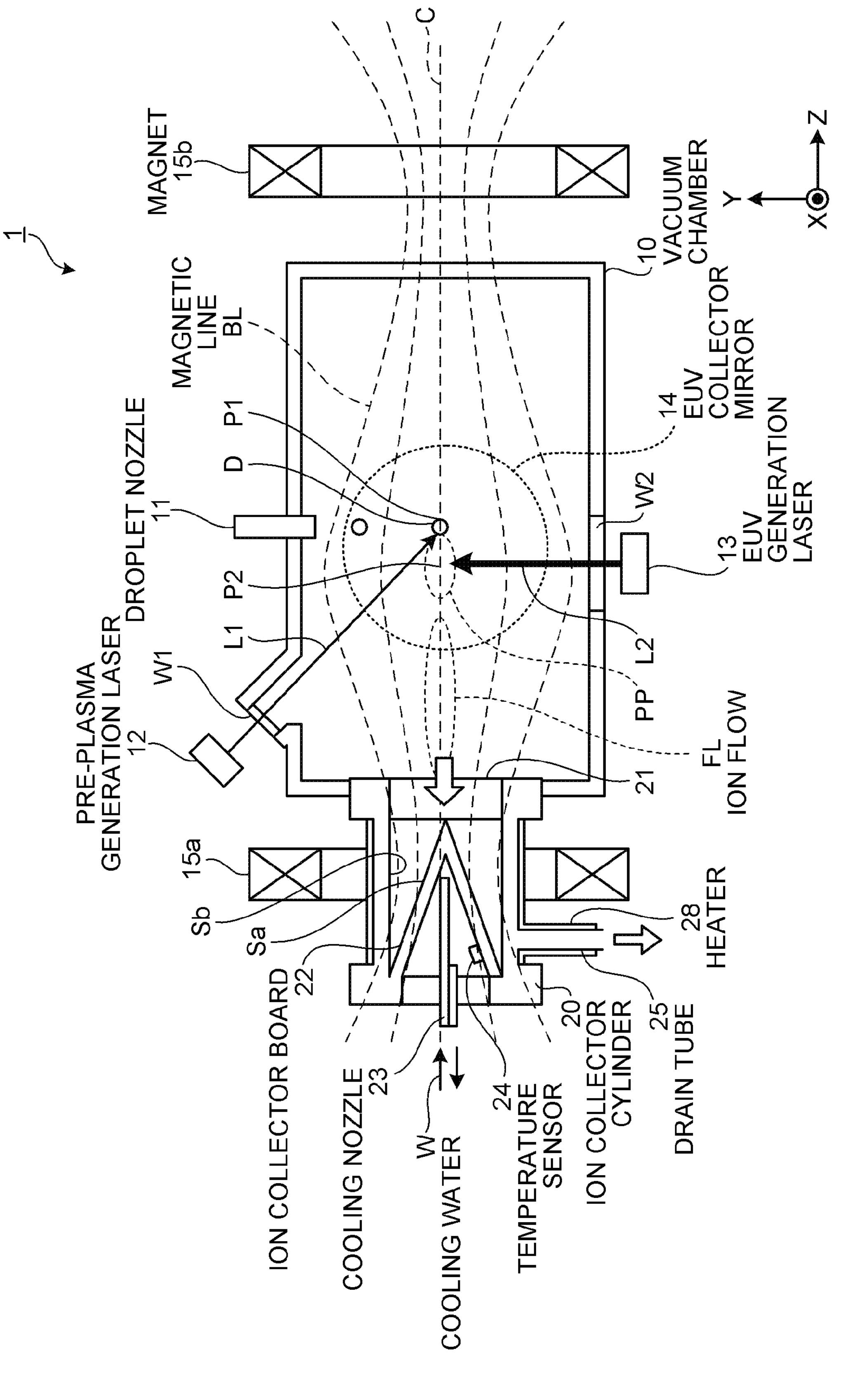
FIG. 1 is a cross-sectional view showing a structure of an extreme ultraviolet light source apparatus according to a first embodiment of the present invention.

Firstly, an extreme ultraviolet light source apparatus according to a first embodiment of the present invention will be described in detail with reference to the accompanying drawings. FIG. 1 is a cross-sectional view showing a structure of an extreme ultraviolet light source apparatus according to a first embodiment of the present invention. In FIG. 1, the extreme ultraviolet light source apparatus 1 has a vacuum chamber 10, to which inside droplets D of molten Sn are to be outputted from a droplet nozzle 11. Here, the vacuum chamber 10 does not necessarily need to be connected with an ejection apparatus such as a vacuum pump, or the like, but may be a chamber which is able to maintain enough airtightness. At an outside of the vacuum chamber 10, a pre-plasma generation laser 12 realized by a YAG pulse laser is arranged. A pre-plasma generation laser light L1 emitted from the pre-plasma generation laser 12 enters the vacuum chamber 10 via a window W1, and with that pre-plasma generation laser light L1 is irradiated to a part of the droplet D at an approximately central position P1 of the inside of the vacuum chamber 10. As a result, a pre-plasma PP is generated in a −Z direction with respect to the position P1. Here, pre-plasma means a plasma state or a compound state of plasma and steam.

At the outside of the vacuum chamber 10, an EUV generation laser 13 realized by using a $CO_2$ pulse laser is arranged. An EUV generation laser light L2 emitted from the EUV generation laser 13 enters the vacuum chamber 10 via a window W2, and is emitted to an approximately central position P2 of the pre-plasma PP at a timing of generation of the pre-plasma PP. As a result, an EUV light is emitted from the position P2 and ion debris are generated. The emitted EUV light is outputted outside the vacuum chamber by an EUV collector mirror 14 which focuses the EUV light and emits the EUV light to the outside of the vacuum chamber 10.

On the other hand, at the outside of the vacuum chamber 10, a pair of magnets 15*a* and 15*b* are arranged in a way sandwiching the positions P1 and P2, the pair of the magnets 15*a* and 15*b* generating a magnetic field in a Z direction in order to control a moving direction of ion debris such as Sn ions being diffused from the pre-plasma PP. The pair of magnets 15*a* and 15*b* can be realized by using superconducting magnets, magnet coils, or the like. The ion debris generated at the position P2 are subjected to Lorentz force from the magnetic field formed by the pair of magnets 15*a* and 15*b*, and form an ion flow FL converging around magnetic lines BL and moving along a central axis C of the magnetic field.

In the first embodiment, the pre-plasma PP is generated in the −Z direction, and thereby, the converged ion flow FL moves toward the −Z direction. Therefore, an ion collector cylinder 20 being an ion collector is arranged at a sidewall of the vacuum chamber in the −Z direction.

The ion collector cylinder 20 has a cylindrical form of which shaft axis corresponds with the central axis C of the magnetic field, and has an aperture 21 perpendicular to the central axis C and facing the inside of the vacuum chamber 10. A diameter of the aperture 21 is, for instance, equal to or larger than one half a converge diameter of the ion flow FL, and specifically, is equal to or larger than 100 mm, for instance. In the ion collector cylinder 20, a conical ion collector board 22 of which top faces toward an inside of the vacuum chamber 10 is arranged, an axis of the ion collector board 22 corresponding to the central axis C of the magnetic field. When the target material is tin (Sn), a surface Sa of the ion collector board 22 at a side of the vacuum chamber 10 and an internal surface Sb of the ion collector cylinder 20 are formed by Si layers which are difficult to be sputtered by Sn ions or by Cu layers having Si being implanted, Si having good thermal conductivity. Thus, it is possible to prevent the surface Sa of the ion collector board 22 and the internal surface Sb of the ion collector cylinder 20 from being sputtered by fast Sn ions as being ion debris as the collide.

Furthermore, the surface Sa of the ion collector board 22 tilts with respect to the central axis C. Thereby, a surface colliding with Sn ions becomes wider, which enables to reduce an impact yield per unit area. Accordingly, it is further possible to reduce the amount of sputtering of the surface Sa of the ion collector board 22 and resputtering of Sn atoms being adhered to the surface Sa. Here, a specific inclination angle of the surface Sa with respect to the central axis C is about 30°, for instance.

Figure 2:
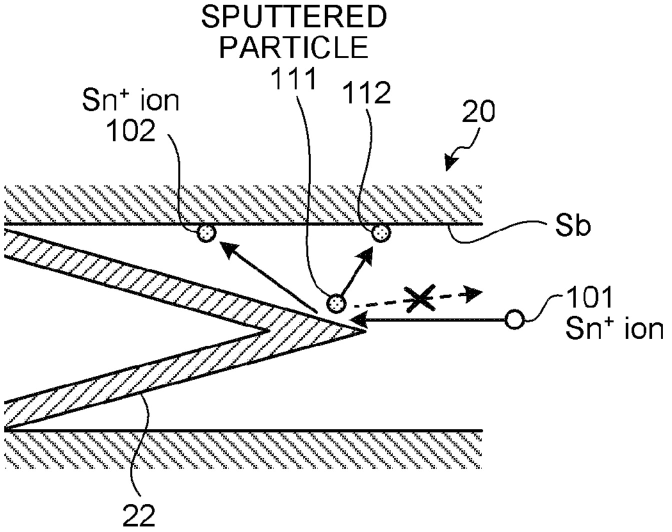
FIG. 2 is a schematic diagram showing an irradiation direction of a sputtered particle in the first embodiment.

Next, an output direction of the sputtered particles generated by sputtering by the $Sn^+$ ions will be described in detail. FIG. 2 is a schematic diagram showing an irradiation direction of a sputtered particle in the first embodiment. As shown in FIG. 2, $Sn^+$ ions inflowing via the aperture 21 generate sputtered particles 111 by sputtering the surface Sa of the ion collector cylinder 22. Here, sputtered particles generated by the sputtering generally fly toward a sputtered surface in an approximately normal direction, and therefore, by arranging such that the surface Sa being an ion collision surface tilts with respect to the central axis C of the magnetic field, it is possible to prevent the sputtered particles 111 from flying toward the aperture 21, and it is possible to trap the sputtered particles 111 at the internal surface Sb. Furthermore, $Sn^+$ ions 102 after the collision with the surface Sa do not bounce toward the aperture 21 but bounce toward a side opposite to the aperture 21, and therefore, $Sn^+$ ions are trapped at the internal surface Sb. As described above, by arranging such that the surface Sa being the ion collision surface tilts with respect to the central axis C of the magnetic field, it is possible to prevent both the sputtered particles 112 generated by sputtering and the $Sn^+$ ions 102 being after the sputtering from flying toward the aperture 21, and it is possible to surely trap the sputtered particles 112 and the $Sn^+$ ions 102 at the internal surface Sb. Moreover, by arranging such that the surface Sa being the ion collision surface tilts with respect to the central axis C of the magnetic field, it is possible to prevent both the sputtered particles 112 generated by sputtering and the $Sn^+$ ions 102 being after the sputtering from flying toward the aperture 21, and therefore, the inside of the vacuum chamber 10 will not be contaminated. As a result, it is possible to stably and secularly generate the EUV light in the vacuum chamber 10.

Figure 3:
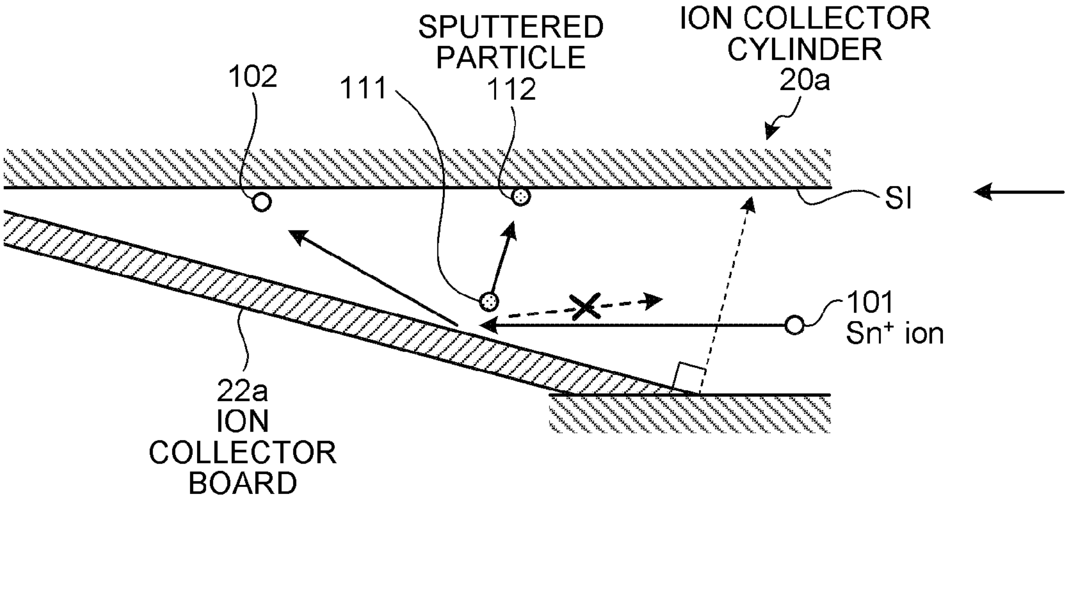
FIG. 3 is a schematic diagram showing an alternate example of an ion collector board according to the first embodiment.

FIG. 3 is a schematic diagram showing an alternate example of an ion collector board according to the first embodiment. As shown in FIG. 3, an ion collector board 22*a* which is a single skew plate can be arranged in an ion collector cylinder 20*a* instead of the conical ion collector board 22. In this structure also, because an ion collision surface tilts, it is possible to prevent both the sputtered particles 112 generated by sputtering and the $Sn^+$ ions 102 being after the sputtering from flying toward the aperture 21, and it is possible to surely trap the sputtered particles 112 and the $Sn^+$ ions 102 at the internal surface Sb. Furthermore, by using the ion collector board 22*a* tilting with respect to the central axis C of the magnetic field, it is possible to prevent both the sputtered particles 112 generated by sputtering and the $Sn^+$ ions 102 being after the sputtering from flying toward the aperture 21, and therefore, the inside of the vacuum chamber 10 will not be contaminated. As a result, it is possible to stably and secularly generate the EUV light in the vacuum chamber 10.

Moreover, into a space which is comparted by a back side (a side opposite to the surface Sa) and a bottom of the ion collector board 22, a cooling water W is supplied through a cooling nozzle 23 in order to prevent the ion collector board 22 from being overheated. At the back side of the ion collector board 22, a temperature sensor 24 is arranged. The ion collector board 22 is thermally controlled so that a temperature to be detected by the temperature sensor 24 becomes equal to or greater than a melting temperature of the target material (when the target material is Sn, 231° C. or higher). By this arrangement, it is possible to drain the target material (Sn, for instance) adhered to the surface Sa of the ion collector board 22 and the internal surface of the ion collector cylinder 20 via a drain tube 25. As a result, it is possible to solidify Sn on the ion collector board 22, and therefore, it is possible to constantly expose the surface exhibiting high resistance to sputtering. The internal surface Sb of the ion collector cylinder 20 which is not to be collided directly with the ion debris will not be heated naturally. Accordingly, as with the case of the ion collector cylinder 20*a* shown in FIG. 4, it is preferable to arrange a heater 28 at an outer wall of the ion collector cylinder 20*a* in order to thermally control the ion collector cylinder 20*a* to a temperature equal to or higher than the melting temperature. Moreover, in order to drain the molten Sn toward the direction of gravitational force, it is preferable to make the ion collector cylinder 20*a* tilt to a drain direction.

Figure 4:
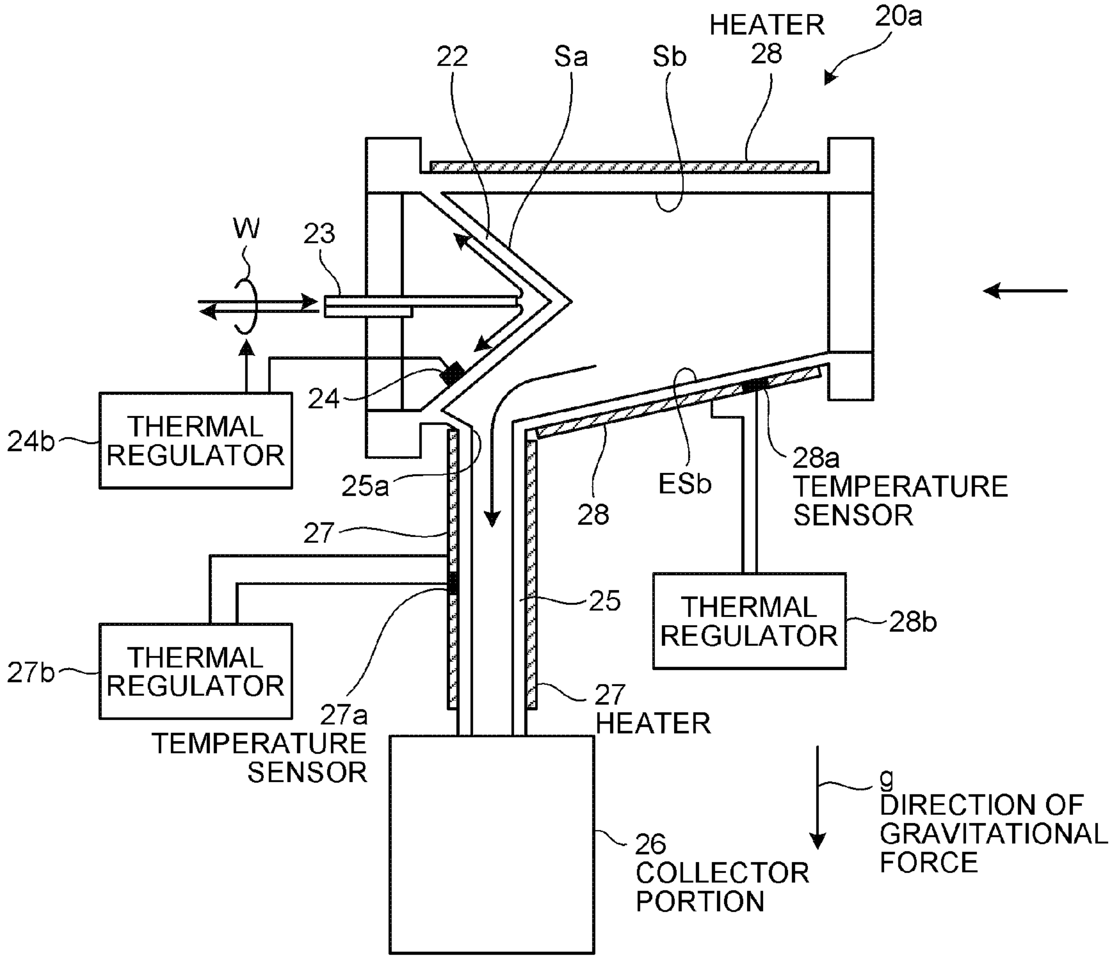
FIG. 4 is a cross-sectional view showing a structure of an alternate example of an ion collector cylinder shown in FIG. 1.

For example, as shown in FIG. 4, among the internal surfaces Sb of the ion collector cylinder 20*a*, an internal surface ESb which is at a side of the direction of the gravitational force is made to tilt toward an aperture 25*a* which is at an entrance side of the drain tube 25. An internal passage of the drain tube 25 is facing toward the direction of the gravitational force. At an exit side of the drain tube 25, a collector portion 26 which is to collect molten Sn is arranged. An external surface opposite to the internal surface Sb is covered with the heater 28, and an external surface of the drain tube 25 is covered with another heater 27. At each external surface, temperature sensor 28*a* or 27*a* is attached. Each of the temperature heaters 28*a* and 27*b* thermally controls the temperature of each of the internal surfaces by supplying a current to the heater 28 or 27 based on the temperature detected by the temperature sensor 28*a* or 27*a*. On the other hand, as described above, on the back side of the ion collector board 22, the cooling water W is supplied through the cooling nozzle 23. By this arrangement, the surface Sa of the ion collector board 22 is thermally controlled so that the surface Sa is not to be overheated. In this thermal control, a thermostat 24*b* adjusts a flow rate of the cooling water W supplied to the back side of the ion collector board 22 based on the temperature detected by the temperature sensor 24. Thereby, the temperature in the ion collector cylinder 20*a* is maintained at the melting temperature of Sn almost constantly. In addition, all of the molten Sn flow toward the direction of gravitational force while being in a liquid state, to be finally, is collected by the collector portion 26. Here, besides the heaters 27 and 28 and the cooling water W, any kind of temperature components such as sheet heater, Peltier element, or the like, can be used.

In the first embodiment described above, because the ion collision surfaces such as the surface Sa of the ion collector board 22, the internal surface Sb, and so on, are formed by Si, sputtering rate by the incident Sn ion is made less than 1 (atom/ion). However, such arrangement is not definite while it is not necessity to provide metal coatings made from Si, or the like, on the ion collision surfaces. Moreover, in the first embodiment, because the sputtered particles cannot fly out from the ion collector cylinder 20/20*a* through the aperture 21, it is possible to locate whole of the ion collector cylinder 20/20*a* in the vacuum chamber 10.

Second Embodiment

Next, an extreme ultraviolet light source apparatus according to a second embodiment of the present invention will be described in detail with reference to the accompanying drawings. In the above-described first embodiment, by making the surface Sa of the ion collector board 22 tilt, at least the sputtered particles are prevented from flying out to the side of the aperture 21. On the other hand, in the second embodiment, by charging the sputtered particles and trapping the charged sputtered particles inside the ion collector cylinder using Coulombic force, sputtered particles, which fly out from the ion collision surface, are prevented from escaping to the side of the vacuum chamber 10 is prevented.

Figure 5:
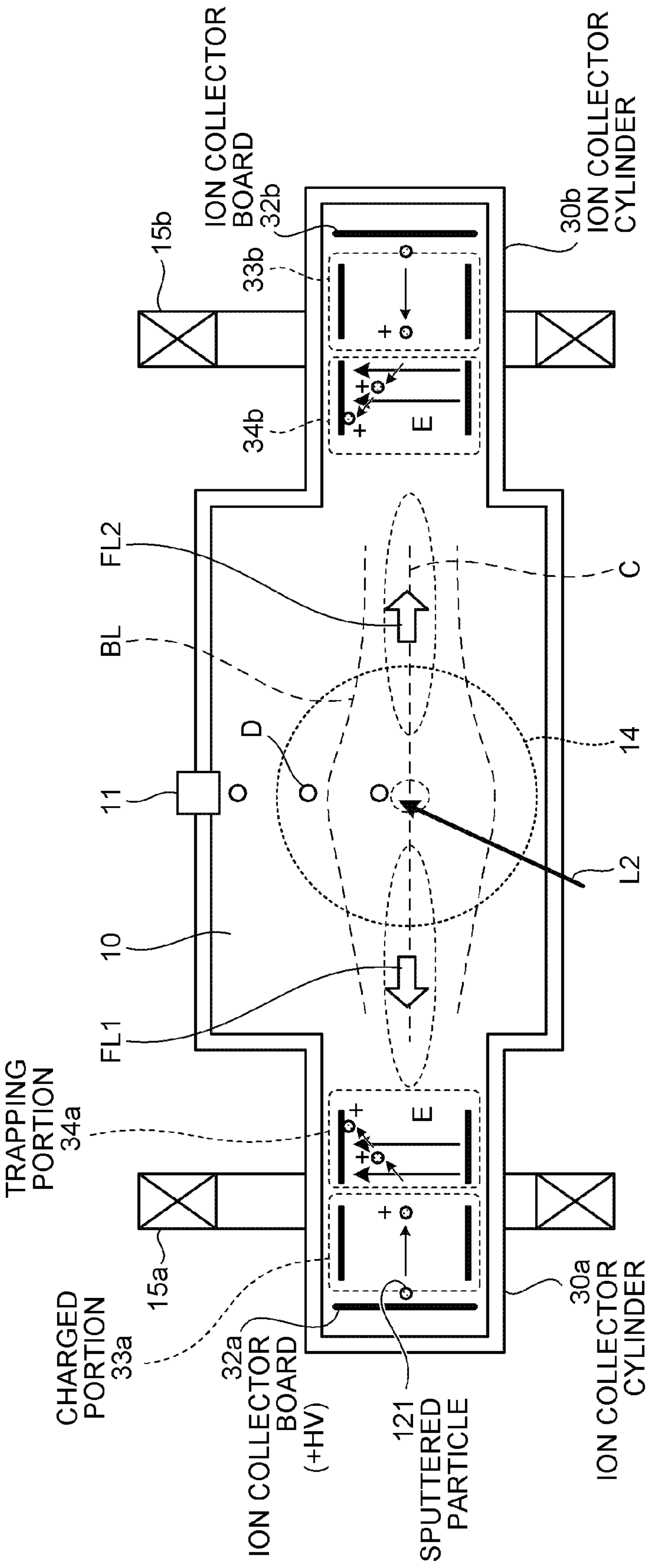
FIG. 5 is a cross-sectional view showing a structure of an extreme ultraviolet light source apparatus according to a second embodiment of the present invention.

FIG. 5 is a cross-sectional view showing a structure of the extreme ultraviolet light source apparatus according to the second embodiment of the present invention. In the second embodiment, a pair of ion collector cylinders 30*a* and 30*b* facing each other are arranged on the central axis C of the magnetic field. Thus, it is possible to collect Sn ions moving and converging along the central axis C of the magnetic field by the ion collector cylinder 30*a* and 30*b*. In the ion collector cylinder 30*a*/30*b*, starting from the bottom side, an ion collector plate 32*a*/32*b*, a charged portion 33*a*/33*b* and a trapping portion 34*a*/34*b* are arranged. The charged portions 33*a* and 33*b* charge sputtered particles 121 which are sputtered from the ion collector boards 32*a* and 32*b*, respectively. The trapping portions 34*a* and 34*b* curve moving trajectories (tracks) of the sputtered particles 121 which lead toward the sides of apertures. Thereby, it is possible to trap the sputtered particles at the side of an internal surface, respectively.

Figure 6:
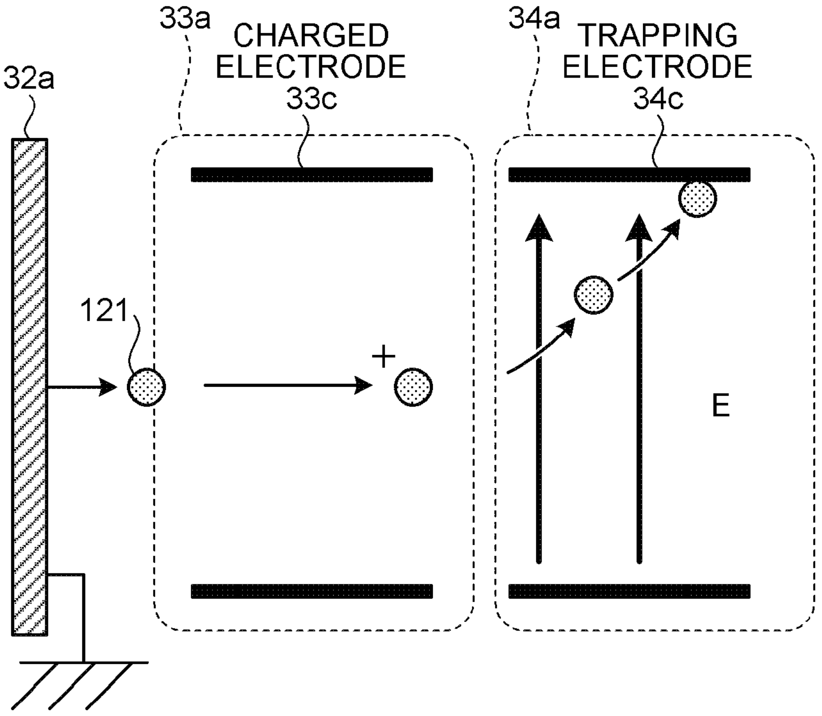
FIG. 6 is a schematic diagram showing a detailed structure of an inside of an ion collector cylinder according to the second embodiment.
Figure 7:
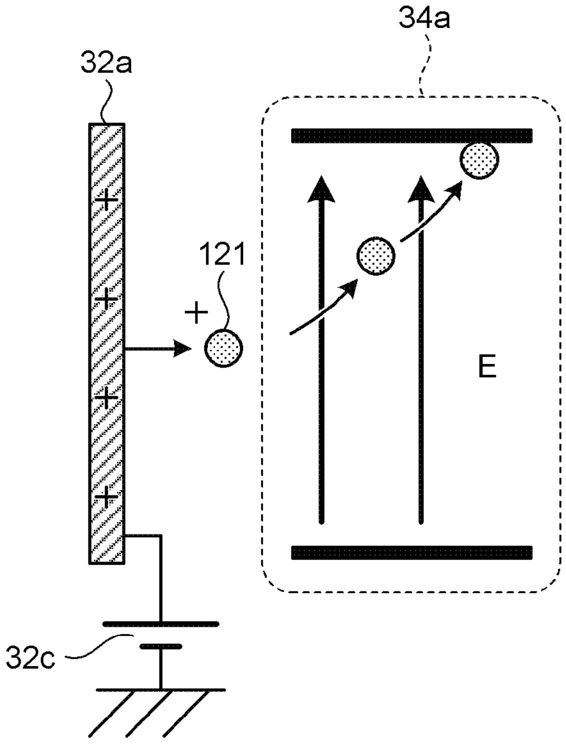
FIG. 7 is a schematic diagram showing a detailed structure of an alternate example of the inside of the ion collector cylinder according to the second embodiment.

That is, as shown in FIG. 6, the ion collector board 32*a* is grounded, the charged portion 33*a* has a pair of charged electrodes 33*c* at a side of the internal surface, and the trapping portion 34*a* has a pair of trapping electrodes 34*c* at a side of the internal surface. The sputtered particles 121 generated at the ion collector board 32*a* are charged when passing through between the charged electrodes 33*c*. After that, because the moving directions of the charged sputtered particles 121 are curved toward a negative electrode among the trapping electrodes 34*c* by Coulombic force from the electrical field E formed between the trapping electrodes 34*c*, the charged sputtered particles 121 are trapped by the trapping portions 34*a* and 34*b*. As a result, the sputtered particles 121 are prevented from moving toward the aperture, and thereby, the sputtered particles 121 are prevented from flowing into the vacuum chamber 10. In the second embodiment, the sputtered particles are positively charged. But, when an reversed voltage is applied to the charged electrodes, the sputtered particles can be charged negatively.

Furthermore, in the second embodiment, although the charged portion 33*a* is being arranged, such arrangement is not definite. It is also possible to arrange such that the ion collector board 32*a* is charged positively or negatively by a power supply 32*c*, and charges the sputtered particles 121 simultaneously with generation of the sputtered particles 121. In this case, it is possible to omit the charged portions 33*a* and 33*b*.

Third Embodiment

Next, an extreme ultraviolet light source apparatus according to a third embodiment of the present invention will be described in detail with reference to the accompanying drawings. In the third embodiment, by suctioning gas between a vacuum chamber and an ion collector board, generated sputtered particles are exhausted outside the ion collector cylinder. By this structure, it is possible to prevent the sputtered particles from flowing into the vacuum chamber.

Figure 8:
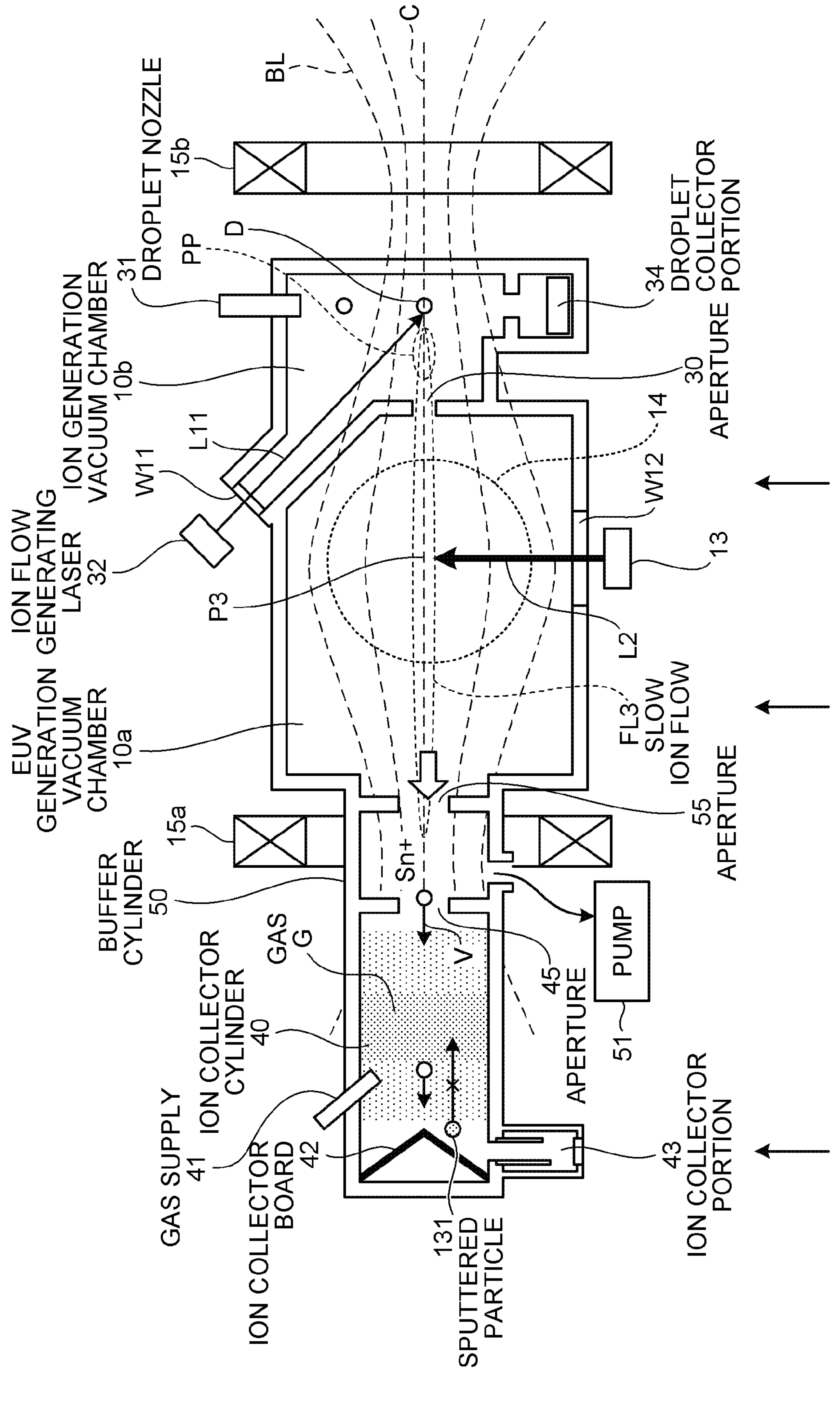
FIG. 8 is a cross-sectional view showing a structure of an extreme ultraviolet light source apparatus according to a third embodiment of the present invention.

FIG. 8 is a cross-sectional view showing a structure of the extreme ultraviolet light source apparatus according to the third embodiment of the present invention. As shown in FIG. 8, the extreme ultraviolet light source apparatus has an ion generation vacuum chamber 10*b* and an EUV generation vacuum chamber 10*a*. The ion generation vacuum chamber 10*b* and the EUV generation vacuum chamber 10*a* are arranged adjacently, and connected to each other via an aperture 30 passing through the central axis C of the magnetic field.

The ion generation vacuum chamber 10*b* has a droplet nozzle 31. From the droplet nozzle 31, a droplet D of molten Sn is outputted toward the inside of the vacuum chamber 10*b*. Furthermore, the ion generation vacuum chamber 10*b* has a window W11 for passing an ion flow generation laser light L11 emitted from an ion flow generation laser 32. The ion flow generation laser light L11 is emitted to the droplet D through the window W11. This irradiation of the droplet D with the ion flow generation laser light L11 generates a pre-plasma PP. Here, the site where the pre-plasma PP is generated is near the central axis C of the magnetic field and the ion flow generation laser light L11 is emitted from a side of an ion collector cylinder 40, and therefore, the pre-plasma PP is generated at the side of the ion collector cylinder 40 with respect to the droplet D. The pre-plasma PP moves toward the side of the ion collector cylinder 40 along the central axis C while converging near the central axis C of the magnetic field.

The pre-plasma PP includes non-charged debris such as tiny particles and neutral particles other than Sn ion. These debris are not influenced from the magnetic field, and therefore, diffuses inside the ion generation vacuum chamber 10*b*. In addition, at a position facing the droplet nozzle 31, a droplet collector portion 34 for collecting residual droplets is arranged.

Sn ions moving toward the side of the ion collector cylinder 40 along the central axis C moves into the EUV generation vacuum chamber 10*a* through the aperture 30. An opening size of the aperture 30 is as small as almost a diameter of the moving Sn ion flow. Therefore, almost all the tiny particles and neutral particles which are above-mentioned diffusing debris will not enter the EUV generation vacuum chamber 10*a*. Moreover, even if the debris pass through the aperture 30, because the movement of the passing debris has directivity, almost all the passing debris will be collected by the ion collector cylinder 40, and therefore, debris will not adhere to the EUV collector mirror 14, and so forth.

The EUV generation vacuum chamber 10*a* has a window W12. The EUV generation laser light L2 emitted from the EUV generation laser 13 enters the EUV generation vacuum chamber 10*a* through the window W12. A focus position of the EUV collector mirror 14 is arranged on the central axis C. The EUV generation laser light L2 is emitted at a timing of a slow Sn ion flow FL3 that moves along the central axis C arriving at the focus position. Thereby, the slow Sn ion flow FL3 becomes plasma, and Sn ions are generated while the EUV light is emitted.

The slow Sn ion flow FL3 is almost entirely Sn ions. Therefore, the EUV generation laser light L2 with small power that is necessary only for luminescence of the EUV light when the slow Sn ions are used as the target material may be emitted. As a result, it is possible to reduce energy of the generated Sn ions. According to this structure, for instance, the energy of the Sn ions having arrived at an ion collector board 42 of the ion collector cylinder 40 becomes less than 0.5 keV, and thereby, it is possible to fundamentally suppress the sputtering at the collision surface.

In the third embodiment, while the ion collection cylinder 40 with a gas region is arranged, a buffer cylinder 50 is arranged between the EUV generation vacuum chamber 1*a* and the ion collection cylinder 40.

As same as the ion collector cylinder 20, the ion collector cylinder 40 has a cylindrical shape, and has an aperture 45 at a side of the EUV generation vacuum chamber 10*a*. Furthermore, the ion collector cylinder 40 has the conical ion collector board 42. In a space comparted by a surface of the ion collector board 42 and an internal surface of the ion collector cylinder 40, the gas region filled with gas G such as noble gas, or the like is formed. Sn ions having entered through the aperture 45 lose energy by colliding with the noble gas, and thereby, Sn ions are deaccelerated. As a result, the surface of the ion collector board 42, and so on, become difficult to be sputtered by the Sn ions.

Moreover, the buffer cylinder 50 is arranged between the EUV generation vacuum chamber 10*a* and the ion collector cylinder 40. Sn ions move to the ion collector cylinder 40 through this buffer cylinder 50. The buffer cylinder 50 prevents the gas from entering the EUV generation vacuum chamber 10*a* by way of differentially pumping the gas G supplied from a gas supply 41 using a pump 51.

Figure 9:
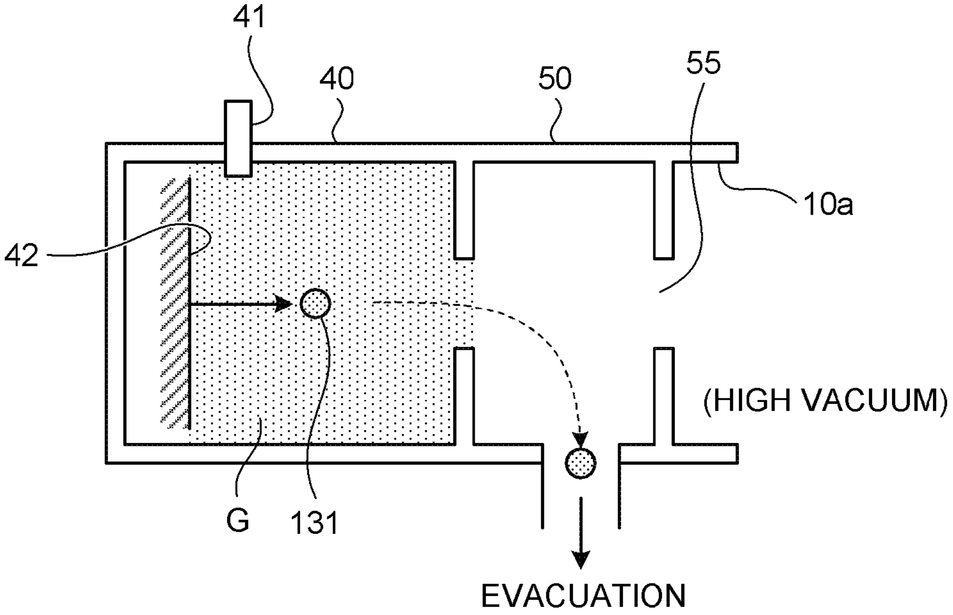
FIG. 9 is a schematic diagram showing a detailed structure of an inside of an ion collector cylinder according to the third embodiment.

Here, sputtered particles 131 generated at the ion collector board 42, as shown in FIG. 9, are emitted inside the gas region. Therefore, the sputtered particles 131 are discharged to the side of the ion collector cylinder 40 together with the generated gas by exhaust by the pump 51 while losing energy and deaccelerating by colliding with the gas G. That is, the sputtered particles 131 are prevented from flowing into the EUV generation vacuum chamber 10*a*.

Meanwhile, the gas supply 41 fills the ion collector cylinder 40 with the noble gas. The gas in the gas region is not limited to noble gas. Atom or molecule of hydrogen or halogen, or mixed gas of them can be applied.

Figure 10:
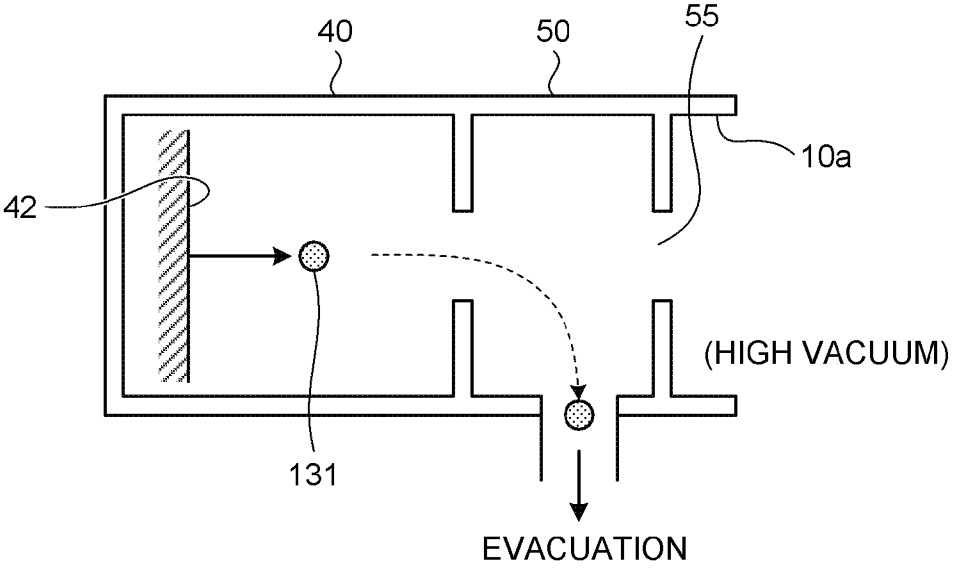
FIG. 10 is a schematic diagram showing a detailed structure of an alternate example of the inside of the ion collector cylinder according to the third embodiment.

As shown in FIG. 10, it is possible to differentially pump the air inside the ion collection cylinder 40 using the pump 51 without having the gas G supplied by the gas supply 41. In this arrangement, the generated sputtered particles 131 are discharged outside the ion collector cylinder 40 by gas flow generated by the differential pumping.

Figure 11:
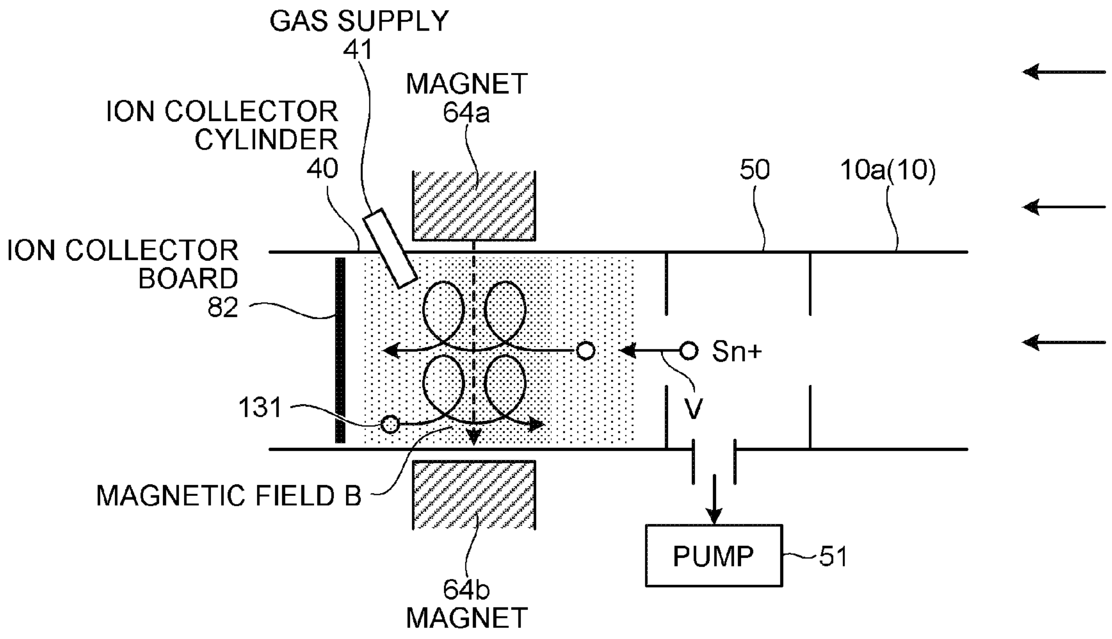
FIG. 11 is a schematic diagram showing a detailed structure of an alternate example of the ion collector cylinder according to the third embodiment.

Here, a gas region longer in the direction of the central axis C is preferable. It is because of the gas region is longer, a number of collisions between the Sn ions and the gas increases, and therefore, the Sn ions can be further deaccelerated. However, the longer gas region is made possible by the longer ion collector cylinder 40. Therefore, as shown in FIG. 11, for instance, it is preferable to arrange a pair of magnets 64*a* and 64*b* in a direction perpendicular to the Sn ion flow, while the Sn ions are made to move with rotation using Lorentz force by applying the magnetic field B to the gas region. In this arrangement, even if the gas region is short, it is possible to obtain long moving distances because trajectories (tracks) of Sn ion movements become spiral. Accordingly, pathways of the sputtered particles 131 can be made long while it is possible to increase the number of collisions between the gas and the Sn ions. As a result, it is possible to decrease energy of the sputtered particles themselves and deaccelerate the sputtered particles.

Fourth Embodiment

Figure 12:
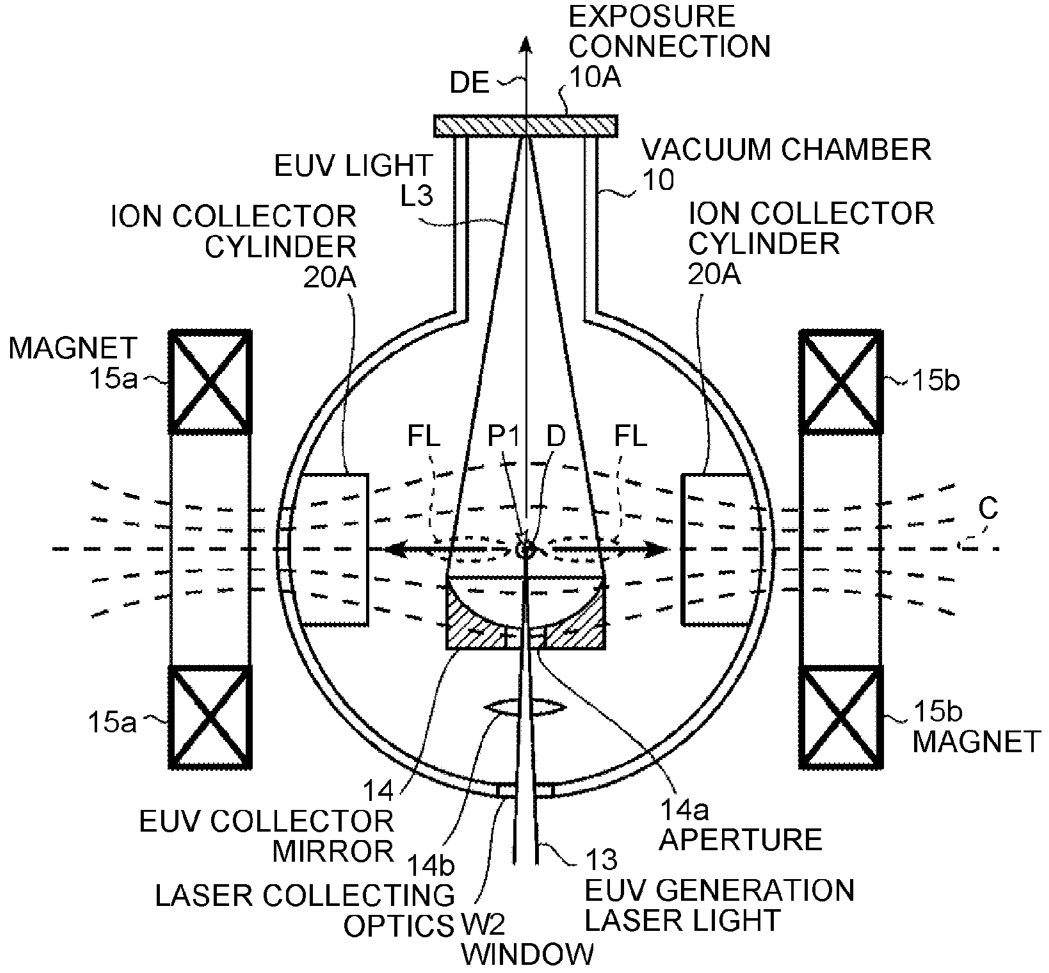
FIG. 12 is a cross-sectional view showing a structure of an extreme ultraviolet light source apparatus according to a fourth embodiment of the present invention.

Next, a fourth embodiment of the present invention will be described in detail with reference to the accompanying drawings. FIG. 12 is a cross-sectional view showing a structure of an extreme ultraviolet light source apparatus according to a fourth embodiment of the present invention. FIG. 12 shows the cross-sectional view when the extreme ultraviolet light source apparatus is cut off at a face including an output direction DE of an EUV light L3 and a central axis C of a magnetic field formed by the magnets 15*a* and 15*b*.

In each of the above-described embodiments, the case where the ion collector cylinder(s) 20, 20*a*, 30*a* and 30*b*, or 40 is arranged outside the vacuum chamber 10 is explained as an example. On the other hand, in the fourth embodiment, ion collector cylinders 20A are arranged inside the vacuum chamber 10. A specific example of the fourth embodiment will be shown in FIG. 12. The magnets 15*a* and 15*b* are arranged outside the vacuum chamber 10 so that a magnetic field with a central axis C which is perpendicular to the output direction DE of the EUV light L3 and passes through the position P1 (or the position P2) is formed. A pair of the ion collector cylinders 20A are arranged so as to sandwich the position P1 in between while incident directions of ion debris thereto correspond to the central axis C. In FIG. 12, a case where the pair of the ion collector cylinders 20A are used is shown as an example. However, such case is not definite while it is also possible that a single ion collector cylinder 20A is arranged.

The EUV generation laser light L2 is emitted to the droplet D at the position P1 from a back side of the EUV collector mirror 14 via the window W2, the laser collection optics 14*b* and the aperture 14*a* of the EUV collector mirror 14. After that, a plasma is generated from the droplet D, and ion debris are generated around the position P1 while the EUV light L3 is emitted from the droplet D. Positive-charged ion debris converge by the magnetic field formed by the magnets 15*a* and 15*b* while moving along with the central axis C as being in a state of an ion flow FL. As a result, the positive-charged ion debris are collected by the ion collector cylinders 20A arranged on the central axis C. The ion collector cylinders 20A can be the ion collector cylinder(s) 20, 20*a*, 30*a* and 30*b*, or 40 according to one of the above-described first to third embodiments. Moreover, the EUV light L3 emitted from the ionized droplet D at the position P1 is outputted via an exposure connection 10A by being reflected by the EUV collector mirror 14 to be focused toward the output direction DE.

As described above, by arranging the ion collector cylinders 20A inside the vacuum chamber 10, it is possible to downsize the extreme ultraviolet light source apparatus, and it is also possible to pull out the vacuum chamber 10 while the magnets 15*a* and 15*b* are fixed. As a result, maintenance of the vacuum chamber 10 can become easier. Since the rest of the structures, operations and effects are the same as in the above-described embodiments and alternate examples, detailed descriptions thereof will be omitted.

Fifth Embodiment

Figure 13:
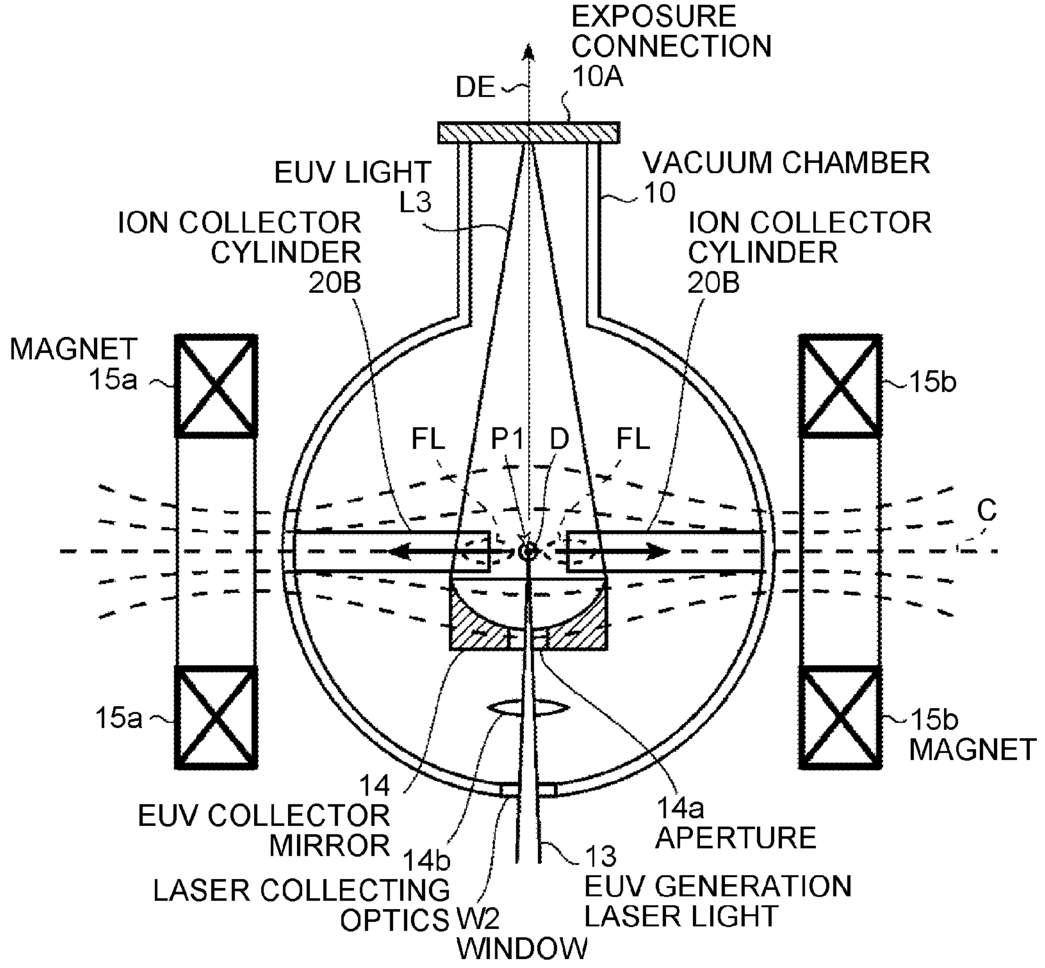
FIG. 13 is a cross-sectional view showing a structure of an extreme ultraviolet light source apparatus according to a fifth embodiment of the present invention.
Figure 14:
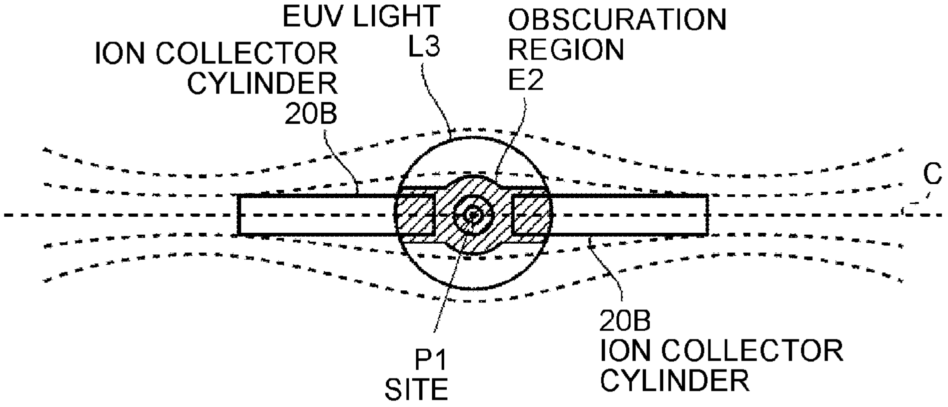
FIG. 14 is a schematic diagram showing a relationship between obscuration region and an ion collector cylinder in the fifth embodiment.

Next, a fifth embodiment of the present invention will be described in detail with reference to the accompanying drawings. FIG. 13 is a cross-sectional view showing a structure of an extreme ultraviolet light source apparatus according to the fifth embodiment of the present invention. FIG. 14 is a schematic diagram showing a relationship between an obscuration region and an ion collector cylinder in the fifth embodiment.

As shown in FIG. 13, the extreme ultraviolet light source apparatus according to the fifth embodiment has the same structure as the extreme ultraviolet light source apparatus shown in FIG. 12 except for the pair of the ion collector cylinders 20A are replaced with a pair of ion collector cylinders 20B. The ion collector cylinders 20B, as the ion collector cylinders 20A, are arranged so as to sandwich the position P1 in between while incident directions of ion debris thereto correspond to the central axis C. However, in the fifth embodiment, as shown in FIG. 14, the ion collector cylinders 20B are arranged so that at least parts thereof (head portions, for instance) are located in an obscuration region E2 (which is a region where an exposure apparatus will not use for exposure). Here, an obscuration region means a region corresponding to such angular range in which the EUV light L3 focused by the EUV collector mirror 14 will not be used in an exposure apparatus. Therefore, in this explanation, a three-dimensional region corresponding to the angular range that will not be used for exposure in an EUV exposure apparatus is referred to as the obscuration region E2. Because the ion collector cylinders 20B are located in the obscuration region E2 that will not contribute to exposure in the EUV exposure apparatus, it is possible to avoid exposure performance and throughput of the exposure apparatus from being influenced.

As described above, by arranging the ion collector cylinder 20B so that at least parts thereof (head portions, for instance) are located in the obscuration region E2, it is possible to locate the generating site (near the position P1) of ion debris and the aperture of the ion collector cylinders 20B close to each other, and therefore, it is possible to collect the ion debris more effectively and surely. Since the rest of the structures, operations and effects are the same as in the above-described fourth embodiment, detailed descriptions thereof will be omitted. In FIGS. 13 and 14, the case where the pair of ion collector cylinders 20B are used is shown as an example. However, such case is not definite while it is also possible that a single ion collector cylinder 20B is arranged. Moreover, each of the ion collector cylinders 20B can be the ion collector cylinder (s) 20, 20*a*, 30*a* and 30*b*, or 40 according to one of the above-described first to third embodiments.

Sixth Embodiment

Figure 15:
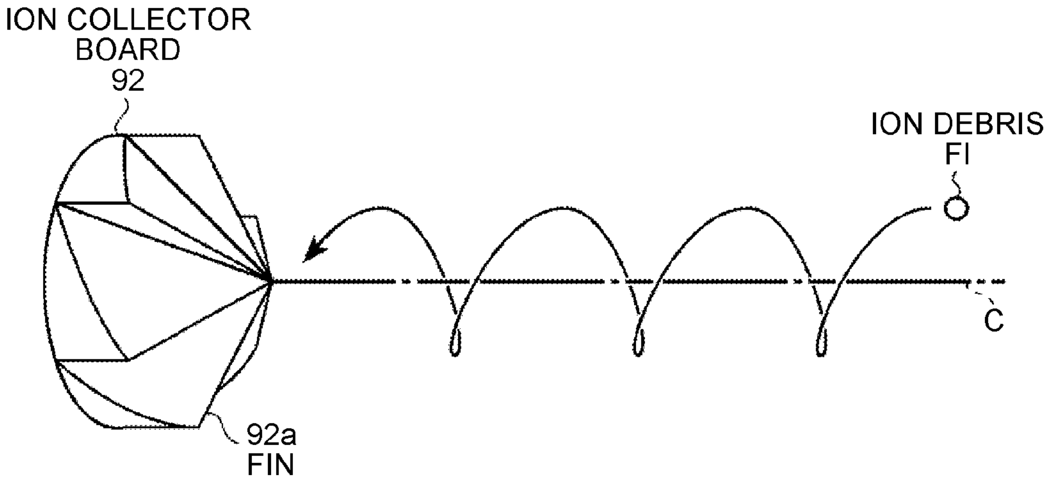
FIG. 15 is a schematic diagram showing a structure of an ion collector board according to a sixth embodiment of the present invention.

Next, a sixth embodiment of the present invention will be described in detail with reference to the accompanying drawings. In the sixth embodiment, another aspect of the ion collector board in each of the above-described embodiments will be explained as an example. FIG. 15 is a schematic diagram showing a structure of an ion collector board according to the sixth embodiment of the present invention. In the above-described embodiments, the conical or tabular ion collector board 22, 22*a*, 32*a*, 32*b*, 42 or 82 is applied. On the other hand, in the sixth embodiment, an ion collector board 92 as shown in FIG. 15 will be applied.

As shown in FIG. 15, the ion collector board 92 according to the sixth embodiment employs a plurality of fins 92*a* each of which ion collision surface twists with respect to a plane perpendicular to the central axis C of the magnetic field. Thereby, because an incident angle of ion debris FI with respect to the ion collision surfaces of the ion collector board 92 (i.e., the surfaces of the fins 92*a*) can be suppressed to a certain degree (equal to or less than 20°, for instance), the ion debris FI can be received by the ion collector board 92 more surely. Since the rest of the structures, operations and effects are the same as the above-described embodiments, detailed descriptions thereof will be omitted.

Seventh Embodiment

Next, a seventh embodiment of the present invention will be described in detail with reference to the accompanying drawings. In the above-described first embodiment, ion debris are collected by being trapped by use of a local-electrical field formed around the position P1 being the plasma generation site. On the other hand, in the seventh embodiment, ion debris are collected by trapping a local-magnetic field formed near the position P1.

Figure 16:
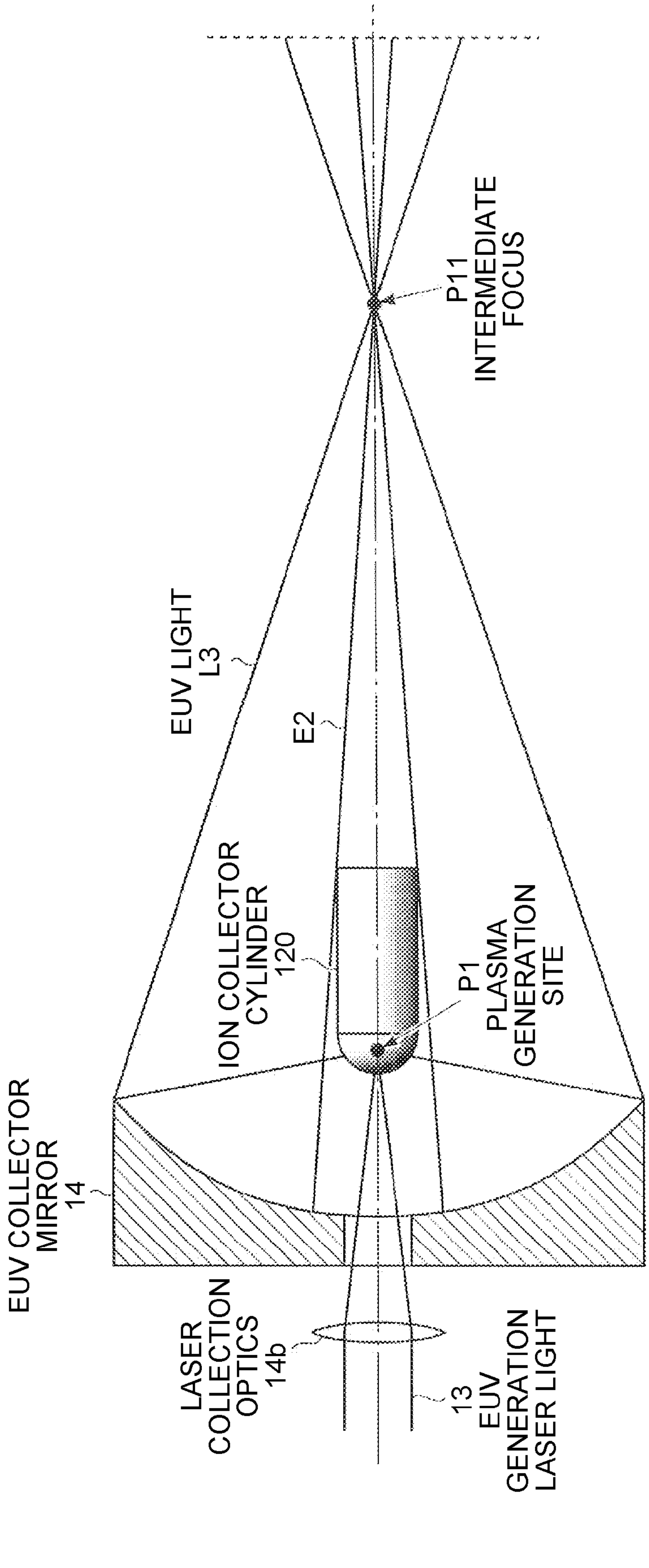
FIG. 16 is a vertical cross-sectional view showing a structure around a plasma generation site in a vacuum chamber of an extreme ultraviolet light source apparatus according to a seventh embodiment of the present invention.
Figure 17:
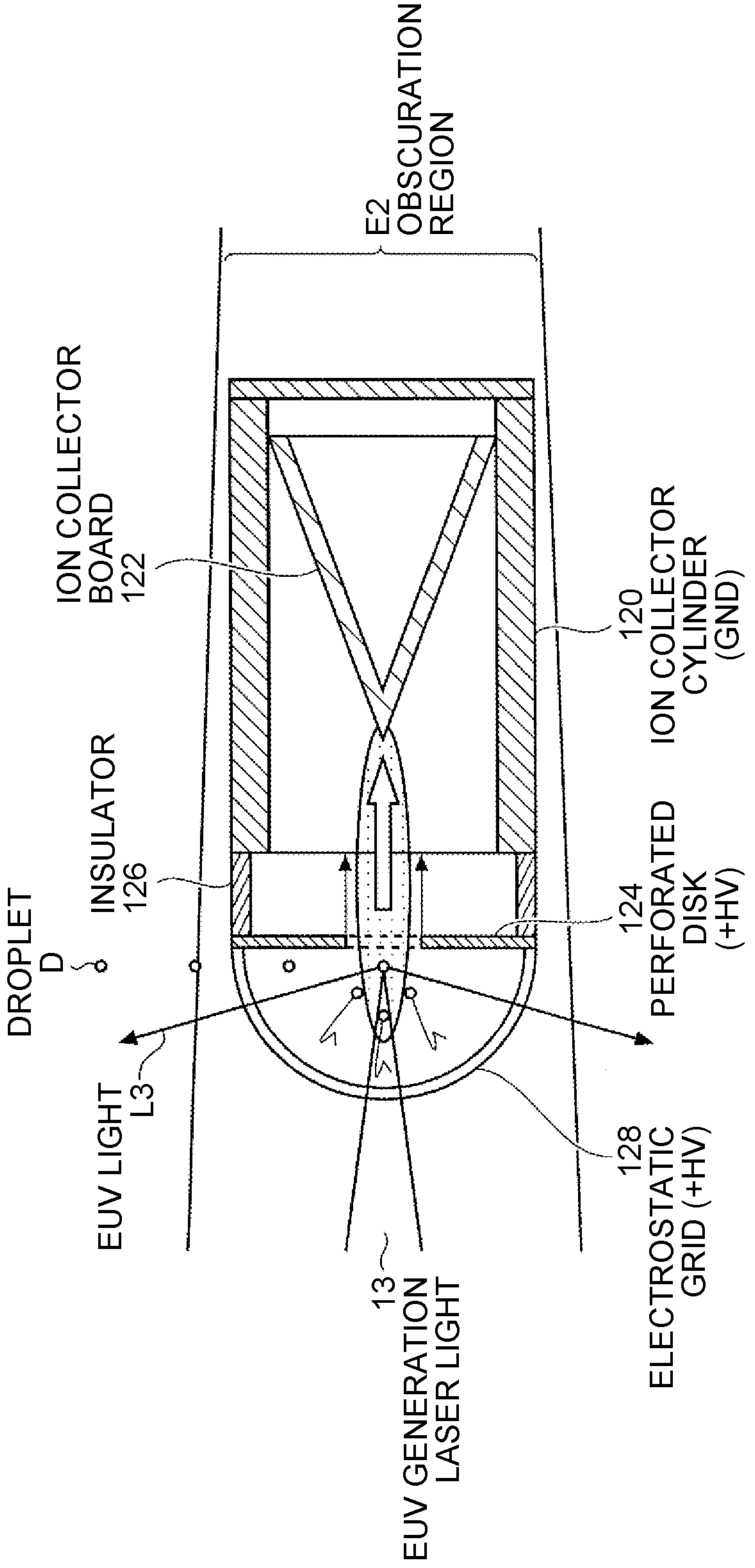
FIG. 17 is an enlarged illustration showing a structure of the ion collector cylinder shown in FIG. 16.
Figure 18:
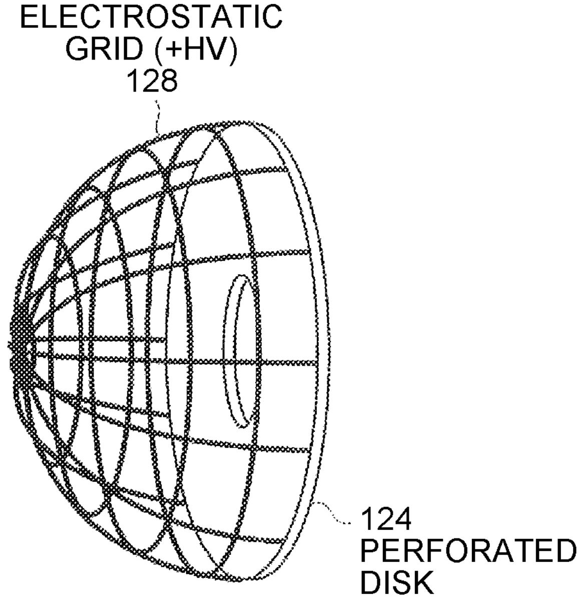
FIG. 18 is a perspective illustration showing an outline structure of an electrostatic grid shown in FIG. 17.

FIG. 16 is a vertical cross-sectional view showing a structure around a plasma generation site in a vacuum chamber of an extreme ultraviolet light source apparatus according to a seventh embodiment of the present invention. FIG. 17 is an enlarged illustration showing a structure of the ion collector cylinder shown in FIG. 16. FIG. 18 is a perspective illustration showing an outline structure of an electrostatic grid shown in FIG. 17.

As shown in FIG. 16, ion debris generated near the position P1 are collected by an ion collector cylinder 120 arranged inside the obscuration region E2 in the vacuum chamber 10. The ion collector cylinder 120 has a size which is able to fit into the obscuration region E2. This size is 30 mm in diameter, for instance.

As shown in FIG. 17, a local-electrical field generator constructed from a perforated disk 124 with an aperture at a center and a centroclinal electrostatic grid 128 is arranged at a side of the position P1 with respect to the ion collector cylinder 120 via an insulator 126. Here, the electrostatic grid 128, as shown in FIG. 18, is a grid with an aperture ratio of more than 90%. Accordingly, incidence of the EUV generation laser 13 into the position P1 and emission of the EUV light L3 from the position P1 are not interrupted substantially. Moreover, a diameter of the aperture formed at the center of the perforated disk 124, for instance, is about 10 mm. However, such arrangement is not definite while a diameter with a degree enabling the flow of ion debris generated around the position P1 toward the ion collector cylinder 120 to not be interrupted can be applied.

The position P1 being the plasma generation site is located inside a hemispherical region formed by the perforated disk 124 and the electrostatic grid 128. Here, the electrostatic grid 128 and the perforated disk 124 are connected to each other, and both of them have a positive electrical potential (+HV) of around 1 to 3 kV being applied. Ion debris generated around the position P1 are charged positively. Ion debris attempting to diffuse are bounced by Coulomb force received from the electrical field generated by the electrostatic grid 128, and drawn inside the ion collector cylinder 120 being a lower electrical potential side via the aperture of the perforated disk 124. The insulator 126 between the perforated disk 124 and the ion collector cylinder 120 is an isolator electrically isolating the two, and it is formed by using an insulator with electrical resistance such as $Al_2O_3$, for instance. Moreover, a thickness of the insulator 126 is a thickness with a degree unabling breakdown to not occur by an electrical potential difference between the electrical grid 128 and the ion collector cylinder 120.

In the ion collector cylinder 120, a conical ion collector board 122 of which top faces toward the EUV collector mirror 14 is arranged. Thus, by having the top of the ion collector board 122 face toward an incident side of the EUV generation laser light 13, it is possible to suppress an irradiance of the EUV generation laser light 13 per unit area, and therefore, it is possible to improve a dumper function with respect to the EUV generation laser light 13. In addition, ion debris having entered in the ion collector cylinder 120 is collected after being adhered to an inner wall of the ion collector cylinder 120.

As the perforated disk 124, a tabular SiC or AlN of which inner face is coated with artificial diamond is used. However, such material is not definite while a material having both heat resistance and high electric conductivity can also be used. Moreover, in order to liquidize the collected ion debris for discharge, it is preferable that the whole ion collector cylinder 120 is thermally controlled to a temperature higher a melting temperature of the target material (which is 230° C. being the melting temperature of Sn, for instance). Additionally, the ion collector cylinder 120 can be formed with Cu with high electrical conductivity, or the like. Furthermore, it is preferable that the surface of the ion collector cylinder 120 is coated with Mo, C, Ti, or the like, which exhibits high resistance to ion sputtering. Moreover, when Mo as being a component material of a multilayer coating forming a reflection surface of the EUV collector mirror 14 is used for the coating, it is possible to reduce the reflection ratio decrease of the EUV collector mirror 14, even if the Mo coating is sputtered.

As described above, in the second embodiment, because ion debris are collected by the local-electrical field formed around the plasma generation site, the same effects as in the above-described embodiments can be obtain. Since the rest of the structures, operations and effects are the same as in the above-described embodiments, detailed descriptions thereof will be omitted.

As described above, according to each of the embodiments of the present invention, the sputtered particles cannot return back to the vacuum chamber owing to the structure in that the ion collector device which collects ion via the aperture formed at the side of the vacuum chamber is arranged, and the sputtered particles are collected at the inside of the ion collector device by having movement of the sputtered particles, which are generated at the ion collision surface collided with ions, in the direction toward the aperture interrupted. Therefore, the inside of the vacuum chamber is not contaminated, and thereby, it is possible to stably and secularly generate the EUV light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents. Furthermore, the above-mentioned embodiments and the alternate examples can be arbitrarily combined with one another.

In addition, in the above-described embodiments and alternate examples, the cases where the ultraviolet light source apparatus is generated by irradiating the pre-plasma as generated by the pre-plasma generation laser for the target material with the laser light is explained as an example. However, such example is not definite. For instance, the target material may be expanded by irradiating the target material with at least a single laser light. After that, the target material having expanded into an optimum size for generating an extreme ultraviolet light may further be irradiated with a laser light in order to generate the extreme ultraviolet light efficiently. Here, the expanded target material is in a state including a single or multiple phases among cluster, steam, tiny particle and plasma.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents. Furthermore, the above-mentioned embodiments and the alternate examples can be arbitrarily combined with one another.

What is claimed is:

1. An extreme ultraviolet light source apparatus generating an extreme ultraviolet light from plasma generated by irradiating a target material with a laser light within a chamber, and controlling a flow of ions generated together with the extreme ultraviolet light using a magnetic field or an electric field, the extreme ultraviolet light source apparatus comprising:

- an ion collector device collecting the ion via an aperture arranged at a side of the chamber; and
- an interrupting mechanism interrupting movement of a sputtered particle in a direction toward the aperture, the sputtered particle generated at an ion collision surface collided with the ion in the ion collector device.

2. The extreme ultraviolet light source apparatus according to claim 1, wherein

- the interrupting mechanism interrupts the movement of the sputtered particle toward the aperture by making the ion collision surface tilt with respect to a direction of the movement of the ion.

3. The extreme ultraviolet light source apparatus according to claim 1, wherein

- the interrupting mechanism is a trapping mechanism arranged between the ion collision surface and the aperture and curving a direction of the movement of the sputtered particle.

4. The extreme ultraviolet light source apparatus according to claim 3, further comprising:

- a charged mechanism charging the sputtered particle, wherein
- the trapping mechanism curves the direction of the movement of the charged sputtered particle using Coulomb force.

5. The extreme ultraviolet light source apparatus according to claim 4, wherein

- the charged mechanism charges the sputtered particle by applying a high electrical potential to the ion collision surface.

6. The extreme ultraviolet light source apparatus according to claim 1, wherein the interrupting mechanism exhausts gas present between the ion collision surface and the aperture, whereby the movement of the sputtered particle toward the aperture is interrupted by flow of the exhausted gas.

7. The extreme ultraviolet light source apparatus according to claim 1, wherein the interrupting mechanism supplies gas between the ion collision surface and the aperture, whereby the movement of the sputtered particle toward the aperture is interrupted by collision of the sputtered particle with the gas.

8. The extreme ultraviolet light source apparatus according to claim 7, further comprising:

a gas supply supplying gas between the ion collision surface and the aperture; and a gas exhaust mechanism exhausting the gas.

9. The extreme ultraviolet light source apparatus according to claim 1, further comprising:

a temperature control mechanism controlling a temperature of an ion collector board of the ion collector device to be equal to or greater than a melting temperature of the target material; and a drain mechanism flowing the target material in a direction of gravitational force.

10. An extreme ultraviolet light source apparatus generating an extreme ultraviolet light from plasma generated by irradiating a target material with a laser light within a chamber, and controlling a flow of ion generated together with the extreme ultraviolet light using a magnetic field or an electric field, the extreme ultraviolet light source apparatus comprising:

an ion collector device collecting the ion via an aperture arranged at a side of the chamber; and an interrupting mechanism arranged inside the ion collector device and having an ion collision surface which tilts with respect to a direction of movement of the ion.

11. The extreme ultraviolet light source apparatus according to claim 10, wherein the interrupting mechanism comprises a trapping mechanism which is arranged between the ion collision surface and the aperture and curves the direction of the movement of the sputtered particle.

12. The extreme ultraviolet light source apparatus according to claim 11, further comprising:

a charge mechanism charging the sputtered particle, wherein the trapping mechanism curves the direction of the movement of the charged sputtered particle using Coulomb force.

13. The extreme ultraviolet light source apparatus according to claim 12, wherein the charge mechanism charges the sputtered particle by applying a high electrical potential to the ion collision surface.

14. The extreme ultraviolet light source apparatus according to claim 10, wherein the interrupting mechanism exhausts gas present between the ion collision surface and the aperture, whereby the movement of the sputtered particle toward the aperture is further interrupted by flow of the exhausted gas.

15. The extreme ultraviolet light source apparatus according to claim 10, wherein the interrupting mechanism supplies gas between the ion collision surface and the aperture, whereby the movement of the sputtered particle toward the aperture is further interrupted by collision with the gas.

16. The extreme ultraviolet light source apparatus according to claim 15, further comprising:

a gas supply supplying gas between the ion collision surface and the aperture; and a gas exhaust mechanism exhausting the gas.

17. The extreme ultraviolet light source apparatus according to claim 10, further comprising:

a temperature control mechanism controlling a temperature of an ion collector board of the ion collector device to be equal to or greater than a melting temperature of the target material; and a drain mechanism flowing the target material in a direction of gravitational force.

* * * * *